(12) United States Patent
Ueda et al.

(10) Patent No.: US 8,888,363 B2
(45) Date of Patent: Nov. 18, 2014

(54) CAST SLAB SURFACE TEMPERATURE MEASURING DEVICE USED IN CONTINUOUS CASTING MACHINE

(75) Inventors: Kazunori Ueda, Tokyo (JP); Takeshi Okawa, Tokyo (JP); Shinichi Fukunaga, Tokyo (JP)

(73) Assignee: Nippon Steel & Sumitomo Metal Corporation, Tokyo (JP)

( * ) Notice: Subject to any disclaimer, the term of this patent is extended or adjusted under 35 U.S.C. 154(b) by 0 days.

(21) Appl. No.: 13/984,377

(22) PCT Filed: Feb. 14, 2012

(86) PCT No.: PCT/JP2012/053351
§ 371 (c)(1),
(2), (4) Date: Aug. 8, 2013

(87) PCT Pub. No.: WO2012/111649
PCT Pub. Date: Aug. 23, 2012

(65) Prior Publication Data
US 2013/0315279 A1    Nov. 28, 2013

(30) Foreign Application Priority Data
Feb. 14, 2011 (JP) ................................. 2011-029006

(51) Int. Cl.
| G01J 5/00 | (2006.01) |
| G01K 1/00 | (2006.01) |
| G01N 3/00 | (2006.01) |
| B22D 11/18 | (2006.01) |
| G01J 5/02 | (2006.01) |
| B22D 11/20 | (2006.01) |

(52) U.S. Cl.
CPC ............... *G01J 5/02* (2013.01); *B22D 11/182* (2013.01); *B22D 11/202* (2013.01)
USPC ................ 374/121; 374/208; 73/803; 73/788

(58) Field of Classification Search
CPC ........................... G01N 17/006; B22D 11/182
USPC ...................... 374/45, 120, 121; 73/788, 803
See application file for complete search history.

(56) References Cited

U.S. PATENT DOCUMENTS 3,251,483 A * 5/1966 Devol ........................... 414/728
4,584,746 A * 4/1986 Tivolle et al. ................ 29/81.08
(Continued)

FOREIGN PATENT DOCUMENTS

| CN | 1410189 A | 4/2003 |
| CN | 2635253 Y | 8/2004 |

(Continued)

OTHER PUBLICATIONS

Korean Office Action dated Aug. 27, 2013 issued in corresponding KR Application No. 10-2013-7021226 [With English Translation].

(Continued)

*Primary Examiner* — Lisa Caputo
*Assistant Examiner* — Nasir U Ahmed
(74) *Attorney, Agent, or Firm* — Kenyon & Kenyon LLP

(57) ABSTRACT

A temperature measuring device, which is used in a continuous casting machine, measures the surface temperature of a part or all of a cast slab in a width direction of the cast slab, which is drawn from a mold and conveyed by rollers, in a secondary cooling zone of the continuous casting machine. The temperature measuring device includes a support member that is installed on the side of roller support parts by which the rollers are rotatably supported; an arm member of which a proximal portion is rotatably mounted on the support member; and a radiation thermometer which is provided at a distal end portion of the arm member and of which a light receiving opening is disposed at a position corresponding to a height in the range of 1.0 to 4.5 m from the surface of the cast slab.

3 Claims, 6 Drawing Sheets

(56) References Cited

U.S. PATENT DOCUMENTS

| | | | | |
|---|---|---|---|---|
| 4,825,701 | A | * | 5/1989 | Holtslander ............... 73/782 |
| 5,865,063 | A | * | 2/1999 | Sheldon ............... 74/490.01 |
| 7,784,354 | B2 | * | 8/2010 | Gelies ............... 73/788 |
| 2008/0058981 | A1 | * | 3/2008 | Andretsch et al. ............ 700/146 |
| 2008/0198900 | A1 | * | 8/2008 | Myhre ............... 374/179 |
| 2009/0103392 | A1 | * | 4/2009 | Bilger ............... 366/4 |

FOREIGN PATENT DOCUMENTS

| | | |
|---|---|---|
| JP | 55-109964 | 8/1980 |
| JP | 55-133858 | 10/1980 |
| JP | 56-151155 | 11/1981 |
| JP | 03-046839 | 4/1991 |
| JP | 06-229833 | 8/1994 |
| JP | 2001-179421 | 7/2001 |
| JP | 2001-205406 | 7/2001 |
| JP | 2004-261652 | 9/2004 |
| JP | 2009-195959 | 9/2009 |
| KR | 20-1991-0002533 | 4/1991 |
| KR | 10-0642780 | 11/2006 |

OTHER PUBLICATIONS

International Search Report dated Apr. 24, 2012, issued in corresponding PCT Application No. PCT/JP2012/053351.
Office Action dated Jan. 13, 2014 issued in corresponding KR Application No. 10-2013-7021226 [With English Translation].
Chinese Office Action dated Mar. 5, 2014 issued in corresponding Chinese Application No. 201280008331.9 (with English Translation).

* cited by examiner

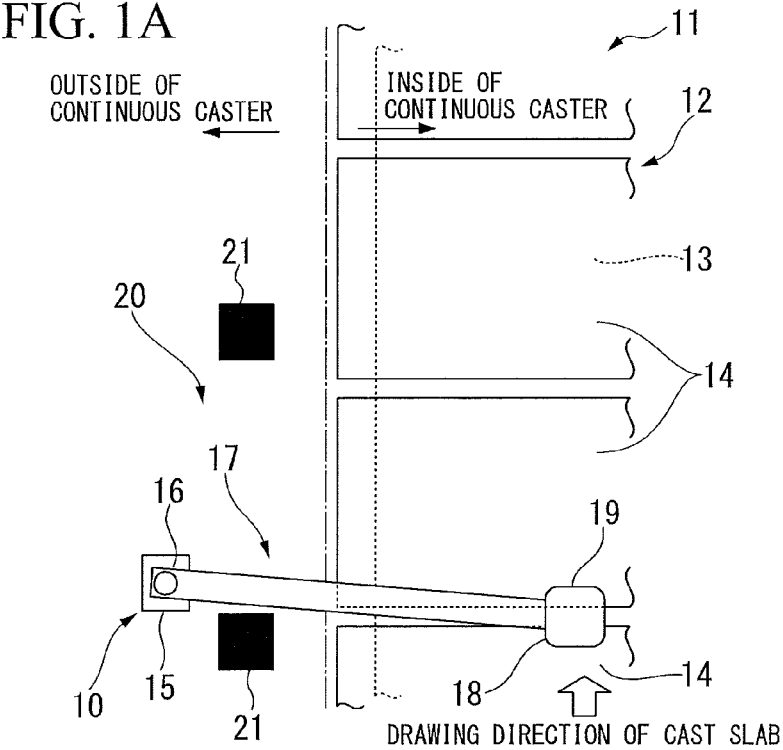
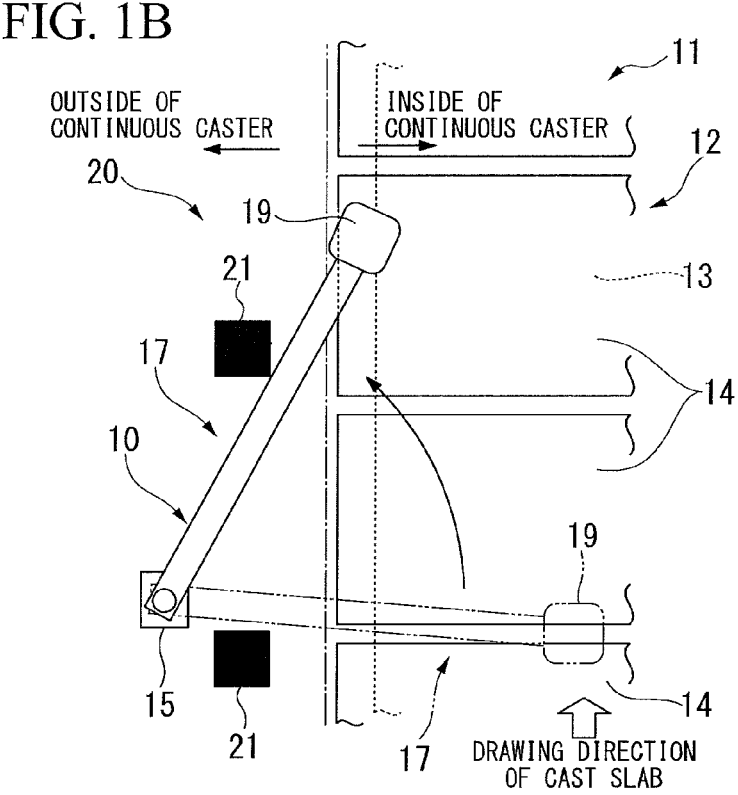

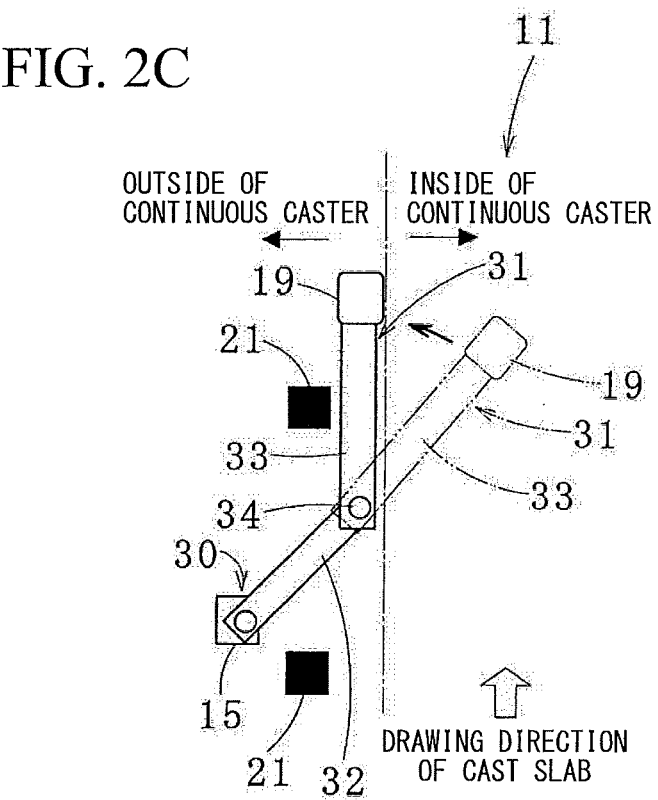

CAST SLAB SURFACE TEMPERATURE MEASURING DEVICE USED IN CONTINUOUS CASTING MACHINE

TECHNICAL FIELD

The present invention relates to a temperature measuring device that measures the surface temperature of a cast slab in a secondary cooling zone of a continuous casting machine. This application is a national stage application of International Application No. PCT/JP2012/053351, filed Feb. 14, 2012, which claims priority to Japanese Patent Application No. 2011-029006, filed Feb. 14, 2011, the content of which is incorporated herein by reference.

BACKGROUND ART

A continuous casting machine, which manufactures a cast slab, includes a mold and a secondary cooling zone that is disposed on the downstream side of the mold and cools a cast slab drawn from the mold while conveying the cast slab in the drawing direction (casting direction). Rollers and a plurality of cooling nozzles are provided in the secondary cooling zone. The rollers are disposed on the surface and back of the cast slab drawn from the mold, and convey (support) the cast slab while the cast slab is interposed between the rollers in a thickness direction. The plurality of cooling nozzles are disposed between the rollers adjacent to each other in a drawing direction, and cool the cast slab that is conveyed by the rollers. There is a case where the rollers provided in the secondary cooling zone are formed by integrating a plurality of rollers with roller segments and a case where the roller segments are not be used.

In the above-mentioned secondary cooling zone, cooling is important for the progress of the solidification of a cast slab and the prevention of quality defects such as cracking of a cast slab, which are caused by supercooling, is also important. For this reason, it is important to measure the surface temperature of the cast slab.

The measurement of the temperature of the surface of the cast slab is not merely simple sporadic measurement of temperature, and the steady measurement of temperature has started to be performed as a quality control index in recent years. Further, as manufacturing quality improves, the improvement of measurement accuracy and the measurement over the entire width direction have started to be required.

When the measurement of the temperature of the surface of a cast slab is steadily performed, keeping measurement accuracy for a long time is essential in a temperature measuring device. The following invention is disclosed in order to solve the above-mentioned problem.

Patent Document 1 discloses a method that temporarily stops the spraying of secondary cooling water to a temperature measurement range of the surface of the cast slab in order to suppress the effect of steam at the time of the measurement of the surface temperature of a cast slab and measures the surface temperature of the cast slab while the generation of steam by the secondary cooling water is suppressed. Patent Document 2 discloses a method that suppresses the effect of steam and the like at the time of the measurement of the surface temperature of a cast slab by surrounding a measurement portion with a hood and purging the air in the hood.

CITATION LIST

Patent Document

[Patent Document 1] Japanese Unexamined Patent Application, First Publication No. 2009-195959

[Patent Document 2] Japanese Unexamined Patent Application, First Publication No. S55-133858

SUMMARY OF INVENTION

Technical Problem

However, the methods in the related art have the following problems still to be solved.

Though tentatively, since the spraying of the secondary cooling water is stopped in the method disclosed in Patent Document 1, the surface temperature of the cast slab rises due to heat recuperation. For this reason, it is not possible to accurately measure the surface temperature of the cast slab in a steady state. In addition, since heat recuperation occurs on the cast slab, there is a concern about the deterioration of the internal quality of the cast slab that is caused by the bulging between the rollers adjacent to each other in the casting direction of the cast slab. The bulging is a phenomenon where a cast slab swells between the rollers adjacent to each other in the casting direction (an area where the cast slab is not supported) due to the static pressure of liquid metal in the cast slab when a cast slab is manufactured by a continuous casting machine.

Further, from the disclosure of Patent document 1, it is apparent that the measurement of the temperature of the cast slab is performed in a place where there is an adverse effect of steam if the spraying of the secondary cooling water is not stopped. For this reason, when spraying is not stopped, condensation or the attachment of steam or dust to a thermometer occurs and adversely affects measurement accuracy.

Furthermore, when a thermometer is disposed close to the continuous casting machine, there is a case where the continuous casting machine should be stopped at the time of the maintenance such as the cleaning of the thermometer or a case where it is difficult to perform the maintenance of the rollers or cooling nozzles (which includes the demounting of the rollers or cooling nozzles from the continuous casting machine).

In addition, in Patent Document 1, the thermometer is installed at a position above one side of the cast slab in the width direction and the measurement of the temperature of the surface of the cast slab is performed obliquely above the cast slab (a position different from a position above the surface of the cast slab). Accordingly, it is difficult to discriminate an edge portion of the cast slab, which is positioned on the side opposite to the installation position of the thermometer, from the surrounding environment. Therefore, it is not possible to accurately define the width of the cast slab, so that it is not possible to specify the position of the edge portion of the cast slab. For this reason, it is difficult to measure the temperature of an edge portion, so that it is not possible to accurately measure temperature.

It is necessary to install the hood at a position close to the cast slab in the method disclosed in Patent Document 2. For this reason, it is necessary to structurally integrate the thermometer with the roller segments. Accordingly, when the thermometer is out of order during the operation of the continuous casting machine, it is not possible to demount the thermometer from the roller segments. For this reason, it is not possible to perform the maintenance of the thermometer.

Further, it is necessary to install devices, which purge the air toward the hood or the cast slab, on the roller segments. For this reason, for example, whenever the roller segments are replaced, it is necessary to perform work for demounting and mounting the devices, so that the production loss of a cast slab caused by the extension of time for replacement is generated.

In addition, when the hood installed at a portion of a cast slab of which the temperature is to be measured is separated from a fixing portion from whatever cause, the hood and the cast slab come into contact with each other, which may cause the generation of scratches on the cast slab.

In order to accurately measure the temperature of a portion that also includes an edge, it is preferable that the thermometer be installed above the cast slab as described above. However, since steam or dust, which adversely affects measurement accuracy, is apt to be attached to the thermometer, it is necessary to suppress the attachment of steam or dust to the thermometer. However, in the related art, it is not possible to accurately measure the surface temperature of a cast slab in a steady state, for example, when the spraying of the secondary cooling water is stopped, and it is not possible to accurately measure the temperature of an edge, for example, when the measurement of the temperature of a cast slab is performed obliquely above the cast slab. Further, for example, when a measurement portion is surrounded by the hood, it is possible to reduce the effect of steam. However, there is a problem in that it is difficult to perform maintenance.

That is, a cast slab surface temperature measuring device, which keeps measurement accuracy for a long time and has excellent maintainability, is not yet provided.

The invention has been made in consideration of the above-mentioned circumstances, and an object of the invention is to provide a cast slab surface temperature measuring device used in a continuous casting machine that can suppress or prevent an effect of steam and the like, which reduces the measurement accuracy of the surface temperature of a cast slab, and simplify a maintenance work of the continuous casting machine by improving the maintainability of the thermometer during continuous casting.

Solution to Problem

In order to achieve the object by solving the above-mentioned problems, the invention employs the following measures.

(1) That is, a temperature measuring device used in a continuous casting machine according to an aspect of the invention measures the surface temperature of a part or all of a cast slab in a width direction of the cast slab, which is drawn from a mold and conveyed by rollers, in a secondary cooling zone of the continuous casting machine. The temperature measuring device includes a support member that is installed on the side of roller support parts by which the rollers are rotatably supported; an arm member of which a proximal portion is rotatably mounted on the support member; and a radiation thermometer which is provided at a distal end portion of the arm member and of which a light receiving opening can be disposed at a position corresponding to a height in the range of 1.0 to 4.5 m from the surface of the cast slab.

(2) In the cast slab surface temperature measuring device used in a continuous casting machine according to (1), the arm member may include a plurality of short arms and the short arms, which are adjacent to each other, may be foldably connected to each other by a connection part.

(3) In the cast slab surface temperature measuring device used in a continuous casting machine according to (2), at least one of the short arms may include a telescopic mechanism of which the length is adjustable.

(4) In the cast slab surface temperature measuring device used in a continuous casting machine according to (1), the arm member may include a telescopic mechanism of which the length is adjustable.

Advantageous Effects of Invention

The temperature measuring device used in a continuous casting machine according to the aspect of the invention includes a support member that is installed on the side of roller support parts; an arm member of which a proximal portion is mounted on the support member; and a radiation thermometer which is provided at a distal end portion of the arm member and of which a light receiving opening is disposed at a position corresponding to a height in the range of 1.0 to 4.5 m from the surface of the cast slab. It is possible to suppress or prevent an adverse effect of steam and the like in a range where the temperature of the cast slab can be measured, by controlling a distance between the surface of the cast slab and the light receiving opening in an appropriate range.

In addition, since the radiation thermometer is installed at an end of the arm member that is rotatably mounted, it is possible to move (retreat) the radiation thermometer by rotating the arm member about the support member at the time of the maintenance of, for example, the continuous casting machine (for example, the maintenance of the rollers or pipes of nozzles for secondary cooling water). Accordingly, the radiation thermometer does not obstruct maintenance. Further, since it is possible to move the radiation thermometer, it is possible to perform the maintenance such as the cleaning of the radiation thermometer without stopping the continuous casting machine.

That is, when the above-mentioned aspect is employed, it is possible to suppress or prevent the effect of steam and the like, which reduces the measurement accuracy of the surface temperature of a cast slab, and to simplify the maintenance work of the continuous casting machine by improving the maintainability of the thermometer during continuous casting.

The arm member may include a plurality of short arms, and the short arms, which are adjacent to each other, may be foldably connected to each other by a connection part. In this case, for example, it is possible not only to rotate the entire arm member about the support member but also to fold the adjacent short arms when moving the radiation thermometer. Accordingly, for example, even though a structure obstructing the movement of the radiation thermometer is present around the continuous casting machine, it is possible to easily make the radiation thermometer retreat to the outside of the continuous casting machine from the inside of the continuous casting machine that is above the surface of the cast slab.

In the above-mentioned configuration, if a folding angle or the like between adjacent short arms is changed, it is possible to also measure the surface temperature of the cast slab in the vicinity of the middle portion of the cast slab in the width direction of the cast slab, for example, at a different position in the drawing (casting) direction of the cast slab. As a result, even though the casting speed is changed, it is possible to measure the surface temperature of the cast slab at a position where behind an outlet of the mold and the cooling time of the cast slab is constatant. Therefore, it is also possible to contribute to the improvement of casting quality.

Since the measurement of the temperature of a cast slab is to be performed at substantially the same position in a fixed point observation manner in order to control quality, the movement of the radiation thermometer with each arm member for maintenance has not been considered in the past.

The arm member or one or more of the plurality of short arms may be provided with a telescopic mechanism of which the length is adjustable. In this case, the number of alternative methods of making the radiation thermometer retreat to the outside of the continuous casting machine from the inside of the continuous casting machine and a method of changing a temperature measurement position on the surface of a cast slab are increased. As a result, the ease of work for making the radiation thermometer retreat and work for changing the position of the radiation thermometer is increased, and it is possible to perform work for making the radiation thermometer retreat and work for changing the position of the radiation thermometer that consider the surrounding (for example, structures) around the continuous casting machine.

BRIEF DESCRIPTION OF DRAWINGS

FIG. 1A is a view illustrating a state where a cast slab surface temperature measuring device used in a continuous casting machine according to an embodiment of the invention measures temperature.

FIG. 1B is a view illustrating the retreat state of the cast slab surface temperature measuring device used in the continuous casting machine according to the embodiment of the invention.

FIG. 2C is a view illustrating the retreat state of the cast slab surface temperature measuring device used in the continuous casting machine according to the first modification.

DESCRIPTION OF EMBODIMENTS

Figure 2A:
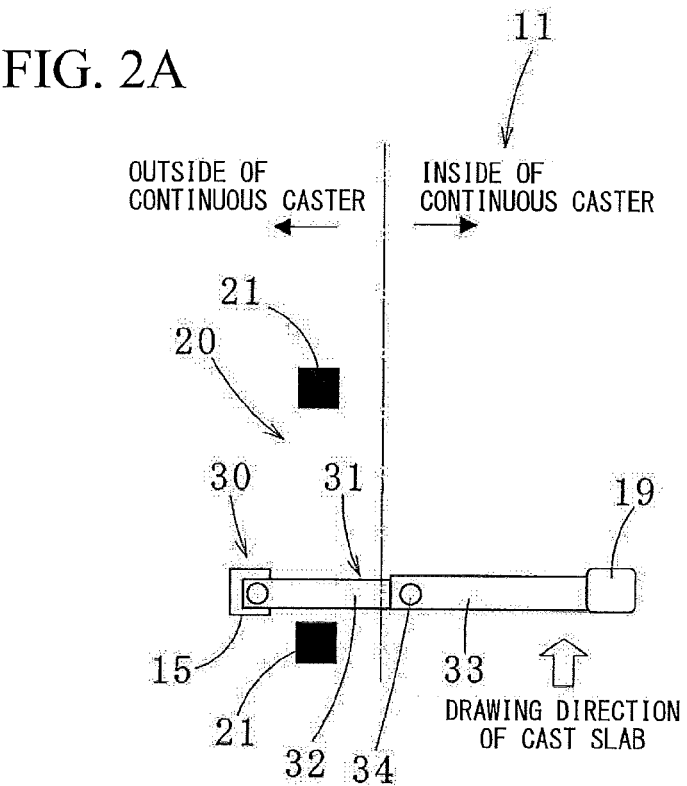
FIG. 2A is a view illustrating a state where a cast slab surface temperature measuring device used in a continuous casting machine according to a first modification measures temperature.

Embodiments of the invention will be described with reference to the attached drawings.

As shown in FIGS. 1A and 1B, a cast slab surface temperature measuring device (hereinafter, also simply referred to as a temperature measuring device) 10 used in a continuous casting machine according to an embodiment of the invention is a device that measures the surface temperature of a cast slab 13, which is drawn from a mold (not shown) in a secondary cooling zone 12 of a continuous casting machine 11 and conveyed by rollers (not shown), in the width direction of the cast slab. The continuous casting machine 11 in which the temperature measuring device 10 is installed is a vertical bending type or curved type continuous casting machine, but is not limited to this. For example, the continuous casting machine 11 may be a vertical type continuous casting machine or the like. The continuous casting machine 11 will be described in detail below.

Rollers and a plurality of cooling nozzles are provided in the secondary cooling zone 12. The rollers are disposed on the surface and back of the cast slab 13 drawn from the mold, and convey the cast slab 13 while the cast slab 13 is interposed between the rollers in a thickness direction. The plurality of cooling nozzles are disposed between the rollers adjacent to each other in a drawing direction (hereinafter, referred to as a casting direction), and cool the cast slab 13. The rollers provided in the secondary cooling zone 12 are integrally formed by roller segments (an example of roller support parts) 14 by which the plurality of rollers are rotatably supported, and the plurality of roller segments 14 are disposed at intervals in the casting direction of the cast slab 13. The maintenance of the rollers, for example, a work for demounting the rollers from the continuous casting machine 11 or a work for mounting the rollers on the continuous casting machine 11 is performed for each of the roller segments 14.

The rollers may have the configuration where the plurality of rollers is not formed integrally. In this case, the work for demounting the rollers from the continuous casting machine or the work for mounting the rollers on the continuous casting machine is individually performed for each roller support part on which one roller (also including a cooling nozzle) is mounted.

The temperature measuring device 10 includes a support (an example of a support member) 15 that is installed on the side of the roller segments 14, an arm member 17 of which a proximal portion (rotating portion) 16 is rotatably mounted on the support 15, and a radiation thermometer (hereinafter, also simply referred to as a thermometer) 19 that is provided at a distal end portion (temperature measuring portion) 18 of the arm member 17.

The support 15 is erected in a passage 20 that is formed on the side of the roller segments 14, that is, outside the continuous casting machine 11 (outside a continuous caster) in the casting direction of the cast slab 13. The support is used here, but the support member is not limited to the support as long as the thermometer 19 can be disposed at a position corresponding to a target height.

The side of the roller segments 14 represents the side of the roller segments 14 (cast slab 13) when the cast slab 13 to be conveyed is seen in plan view. Accordingly, the installation position of the support 15 is not limited to the passage 20. That is, as long as the installation position of the support 15 is not disposed at the roller segments 14 (at the main body of the continuous casting machine 11), the installation position of the support 15 may be disposed at, for example, the frame or the like of the continuous casting machine 11. A distance between the support 15 and the roller segment 14 is not particularly limited as long as the thermometer 19 can be disposed and retreat by the rotation of the arm member 17 as described below.

The arm member 17 is provided in a direction orthogonal to the support 15, and is made of, for example, a steel material. The middle portion of the arm member 17 in the longitudinal direction may be partially folded in plan view in the shape of one or two steps. By setting the shape of the arm member 17, it is possible to reduce the restriction of the movement of the arm member 17, which is caused by the environment around the continuous casting machine 11, for example, a structure 21 (for example, a column and the like) such as a crane that is used to replace the segments when the arm member 17 is rotated (turned) about the support 15.

The shape of the arm member is not limited to the above-mentioned shape, and may be, for example, an "L shape", a "V shape", or an arc shape in plan view according to the environment around the continuous casting machine 11.

It is possible to perform the mounting of the proximal portion 16 of the arm member 17 on the support 15 by, for example, providing a rotating shaft at the arm member and mounting the rotating shaft on the support so that the rotating shaft is rotatable, or providing a rotating shaft at the support and mounting the proximal portion of the arm member on the rotating shaft so that the proximal portion is rotatable.

The arm member 17 is manually rotated relative to the support 15 by, for example, a worker. However, the arm member may be provided with driving measures and may be automatically rotated by a control unit.

The arm member may be further provided with a telescopic mechanism of which the length is adjustable.

As the telescopic mechanism, there are, for example, a slide type telescopic mechanism that has been well known in the past and freely reciprocates an arm member relative to a support in the longitudinal direction of the arm member, a bellows type telescopic mechanism that has been well known in the past and increases and reduces the length of an arm member, and the like. However, the telescopic mechanism is not limited to these.

If the installation position of the temperature measuring device 10 is disposed on the downstream side of the secondary cooling zone 12, the rotation area (hereinafter, also referred to as a turning area) of the above-mentioned arm member 17 becomes a position to which the cast slab 13 is horizontally conveyed and is in a plane parallel to the surface of the cast slab 13. In addition, if the installation position of the temperature measuring device 10 is disposed on the upstream side of the secondary cooling zone 12 (the installation position of the temperature measuring device 10 is close to the mold), the cast slab is conveyed while being curved. Accordingly, the rotation area of the arm member 17 is in a plane that obliquely crosses the surface of the cast slab 13.

The rotation area of the arm member is not limited to this as long as the arm member can move. For example, the rotation area of the arm member may be in a plane that is orthogonal to the surface of the cast slab. Specifically, when the rotation center of the rotating shaft, which is provided at the arm member or the support, is disposed parallel to the casting direction, it is possible to rotate the arm member in a direction where the arm member is separated from or approaches the surface of the cast slab.

For example, a thermometer that has been well known in the past and detects heat radiation energy, which radiated from a high-temperature object, in a non-contact manner may be used as the radiation thermometer 19.

The light receiving opening of the radiation thermometer 19 is disposed at a position that corresponds to the height in the range of 1.0 to 4.5 m from the surface of the cast slab 13.

If the height of the position of the light receiving opening is smaller than 1.0 m from the surface of the cast slab, it is not possible to secure the distance that is required for the diffusion of steam generated by secondary cooling water. As a result, condensation or the attachment of steam or dust to the thermometer occurs, so that measurement accuracy is reduced. For this reason, the height of the position of the light receiving opening is set to 1.0 m or more from the surface of the cast slab 13. However, there is a case where an upper end of the roller segment reaches the position corresponding to a height smaller than 1 m from the surface of the cast slab. In this case, when the thermometer is turned, the thermometer comes into contact with the roller segment. For this reason, the thermometer cannot be moved to a measurement position. In order to reliably avoid this contact, the height of the light receiving opening from the surface of the cast slab 13 is preferably 1.3 m or more and more preferably 1.5 m or more.

In addition, a gap between the adjacent roller segments, that is, a gap that is used to measure the temperature of the cast slab is very small, for example, in the range of 30 to 200 mm. For this reason, when the height of the position of the light receiving opening exceeds 4.5 m from the surface of the cast slab, the fixing angle of the thermometer slightly deviates and the temperature of the roller is measured rather than the temperature of the cast slab, so that it is not possible to accurately measure the temperature of the surface of the cast slab. Therefore, the height of the position of the light receiving opening is set to 4.5 m or less from the surface of the cast slab 13. Even when the roller segments are not used, the gap is substantially the same as described above. However, if the height of the position of the light receiving opening exceeds 3.5 m from the surface of the cast slab, operability deteriorates when the thermometer is rotated. Accordingly, it is preferable that the height of the position of the light receiving opening be set to 3.5 m or less from the surface of the cast slab. Further, considering the ease of cleaning of the thermometer or the maintainability of the thermometer, it is more preferable that the height of the position of the light receiving opening be set to 3.0 m or less from the surface of the cast slab.

It is possible to adjust the height of the position of the light receiving opening from the surface of the cast slab 13 by changing the height (length) of the support 15. However, for example, lifting measures may be provided at the support and it may be possible to adjust the height of the position of the light receiving opening from the surface of the cast slab by changing the height of the support.

As long as the installation position of the thermometer 19 is above the surface of the cast slab 13, that is, a position overlapping the cast slab 13 in plan view, the installation position of the thermometer 19 is not particularly limited. However, it is preferable that the installation position of the thermometer 19 be in the vicinity of the middle portion of the cast slab 13 in the width direction of the cast slab, that is, a position above the area within 300 mm from the substantially middle position of the cast slab. By measuring the surface temperature of the cast slab 13 from the middle portion of the cast slab in the width direction, the detection of the distal end portions of the cast slab 13 in the width direction is easy and the contrast between the high-temperature portion of the cast slab 13 and the low-temperature portion deviating from the cast slab 13 is easy. When measurement is performed obliquely above the cast slab, it is difficult to discriminate an edge portion of the cast slab, which is positioned on the side opposite to the installation position of the thermometer, from the surrounding environment. For this reason, it is not possible to accurately measure temperature. In addition, the width of the measurement visual field of the radiation thermometer is also changed between when measurement is performed from above and when measurement is performed obliquely above.

The width of a cast slab, which can be casted by a general continuous casting machine, generally exceeds 1 m. For this reason, in order to measure the surface temperature of the cast slab 13 from the substantially middle portion of the cast slab in the width direction of the case slab, the length of the arm member 17 is set so that the radius of rotation of the thermometer 19 is substantially the same as the sum of a distance between the rotation center of the support 15 and the side surface of the cast slab 13 and 0.8 m (="0.5 that is a half of the width of the cast slab"+"0.3 m that is a deviation from the middle position").

Accordingly, it is possible to clearly define the positions of the distal end portion of the cast slab 13, and to easily confirm that the temperature measurement position is on the cast slab 13.

In order to more accurately measure the surface temperature of the cast slab 13 through between the adjacent roller segments 14, a frame, which is used to tilt the thermometer 19, may be provided at the distal end portion of the arm member 17 and the thermometer 19 may be mounted on the frame. Thereby, it is possible to perform the adjustment (also including fine adjustment) of a temperature measurement position or a temperature measuring range by tilting, for example, the thermometer 19.

The thermometer 19 may reciprocate in the longitudinal direction of the arm member.

The temperature measuring device may be provided with measures for performing air purge toward the light receiving opening of the thermometer (for example, wind speed is in the range of 2 to 10 m/s). Thereby, it is possible to reduce errors during temperature measurement, so that it is possible to improve the accuracy of temperature measurement.

A method of measuring the surface temperature of the cast slab 13 using the cast slab surface temperature measuring device 10, which is used in the continuous casting machine according to the embodiment of the invention, will be described with reference to FIGS. 1A and 1B.

As shown in FIG. 1A, the arm member 17 is rotated about the support 15 (clockwise in FIG. 1A) before the start of continuous casting so that the position of the thermometer 19 becomes a position above an area between the adjacent roller segments 14 in the vicinity of the middle portion of the cast slab 13 in the width direction of the cast slab. The height of the support 15 is adjusted so that the light receiving opening of the thermometer 19 is disposed at a position corresponding to a height in the range of 1.0 to 4.5 m from the surface of the cast slab 13 to be conveyed in the casting direction.

If the thermometer is disposed as described above, it is possible to measure the surface temperature of the cast slab 13 in the width direction of the cast slab in the secondary cooling zone 12 while the cast slab 13 drawn from the mold is conveyed in the casting direction. The surface temperature of the cast slab may be measured at part of the cast slab in the width direction or at the entire cast slab in the width direction (over the width of the entire cast slab) in accordance with the purpose.

By setting the light receiving opening of the thermometer 19 to the position corresponding to the above-mentioned height, it is possible to sufficiently increase the distance between the surface of the cast slab 13 and the light receiving opening up to a position where an adverse effect of steam and the like can be suppressed or prevented, within a range where the temperature of the cast slab 13 can be measured.

Since the thermometer 19 is separated from the surface of the cast slab by 1 m or more, the attachment of steam or dust to the light receiving opening is suppressed. However, when the thermometer 19 is used for a long time or when the thermometer 19 is out of order, the cleaning and maintenance of the thermometer 19 need to be performed. In this case, as shown in FIG. 1B, the arm member 17 is rotated about the support 15 in the direction opposite to the above-mentioned disposition (counterclockwise in FIG. 1B) so that the thermometer 19 is moved to the distal end portion of the continuous casting machine 11 in the width direction of the continuous casting machine, that is, a position where the maintenance of the thermometer 19 can be performed. Accordingly, it is not necessary to stop the continuous casting machine 11 whenever the maintenance of the thermometer 19 is performed, and it is possible to always perform the maintenance of the thermometer 19.

Further, since the continuous casting machine 11 is used, the maintenance of the continuous casting machine 11 (for example, the maintenance of the rollers or pipes of nozzles for cooling water) also needs to be performed. In this case, since the thermometer 19 is disposed above the surface of the cast slab 13 as shown in FIG. 1A, there is a case where the thermometer 19 obstructs the maintenance of the continuous casting machine 11 as it is and makes the maintenance difficult. Accordingly, the arm member 17 is rotated about the support 15 as shown in FIG. 1B so that the thermometer 19 is moved. Therefore, the maintenance work of the continuous casting machine 11 is simplified.

After the maintenance of the thermometer 19 or the continuous casting machine 11 is finished, the thermometer 19 is disposed again at the position above an area between the adjacent roller segments 14 in the vicinity of the middle portion of the cast slab 13 in the width direction of the cast slab and measures the surface temperature of the cast slab 13 in the procedure opposite to the above-mentioned procedure.

A cast slab surface temperature measuring device (hereinafter, also simply referred to as a temperature measuring device) 30 used in a continuous casting machine according to a first modification will be described with reference to FIGS. 2A to 2C. The same members as the members of the above-mentioned temperature measuring device 10 are denoted by the same reference signs and the detailed description thereof will be omitted.

An arm member 31 of the temperature measuring device 30 includes a plurality of short arms 32 and 33 (two here but may be three or more). The proximal-side short arm 32 and the end-side short arm 33, which are adjacent to each other, are foldably connected to each other by a connection part 34. For example, the folding of the adjacent short arms 32 and 33 is manually performed by a worker. However, the arm member may be provided with driving measures and may be automatically folded by a control unit.

It is possible to make the shape of the arm member 31 be not only a linear shape (an "I" shape) but also an "L shape", a "V shape", or the like in plan view by folding the arm member.

In order to satisfy the above-mentioned radius of rotation of the arm member 17 of the temperature measuring device 10 while the short arms 32 and 33 of the arm member 31 are disposed at a right angle (that is, in an "L shape"), the length of the arm member 31, which has a linear shape, is substantially the same as the sum of a distance between the rotation center of the support 15 and the side surface of the cast slab and 1.1 m.

The above-mentioned arm member 17 of the temperature measuring device 10 shown in FIGS. 1A and 1B is not provided with the connection part that makes the arm member foldable. For this reason, even though the arm member 17 is to be turned so that the thermometer 19 retreats to the outside of the continuous casting machine 11 where the maintenance of the thermometer 19 is easy, the arm member 17 collides with the structure 21 and cannot retreat when a space is very small since various devices are provided around the continuous casting machine 11.

Since the arm member 31 includes the plurality of short arms 32 and 33 and these short arms are adapted to be foldable as described above, the thermometer 19 can retreat to the outside of the continuous casting machine 11 where the maintenance of the thermometer 19 is easy, even though a space is small.

A retreat procedure of the thermometer 19 will be described.

Before the retreat of the thermometer 19, that is, in FIG. 2A, the thermometer 19 is disposed at the position above an area between the adjacent roller segments 14 in the vicinity of the middle portion of the cast slab 13 in the width direction of the cast slab and measures the surface temperature of the cast slab in the width direction. The arm member 31 has a linear shape at this time, but may be folded in an "L shape", a "V shape", or the like according to the temperature measurement position.

Figure 2B:
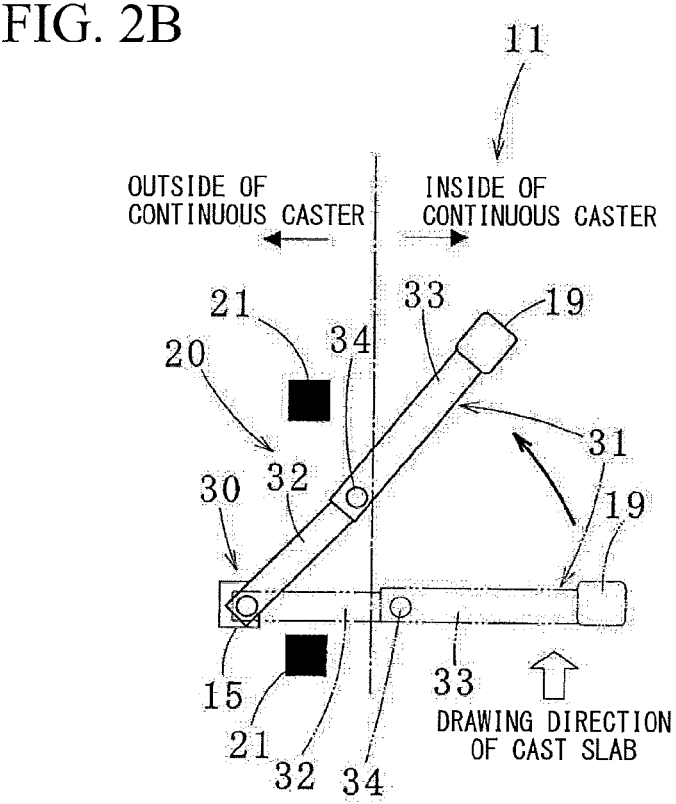
FIG. 2B is a view illustrating a state of the cast slab surface temperature measuring device used in the continuous casting machine according to the first modification in the middle of retreat.

When the thermometer 19 is made to retreat, first, the arm member 31 is rotated about the support 15 in a direction where the thermometer 19 is moved to the outside of the continuous casting machine 11 as shown in FIG. 2B (counterclockwise in FIG. 2B). At this time, the arm member 31 is rotated to a position where the connection part 34, which connects the short arm 32 with the short arm 33, is positioned outside the continuous casting machine 11 in plan view.

Next, the end-side short arm 33 is rotated about the connection part 34 in a direction where the thermometer 19 is moved to the outside of the continuous casting machine 11 as shown in FIG. 2C (counterclockwise in FIG. 2C) so that the arm member 31 is folded in a "V shape" in plan view. At this time, the short arm 33 is rotated to a position where the thermometer 19 and the end-side short arm 33 are positioned outside the continuous casting machine 11 in plan view.

As described above, the support 15 and the arm member 31 of the temperature measuring device 30 form the retreat measures of the thermometer 19. By the above-mentioned configuration, it is possible to make the thermometer 19 reliably retreat to the outside of the continuous casting machine 11 while preventing the arm member 31 (or the thermometer 19) from colliding with the structure 21. For this reason, the maintainability of the thermometer 19 is further improved as compared to a case where the thermometer retreats to the distal end portion of the cast slab in the width direction. Moreover, since it is possible to make the thermometer 19 retreat to the outside of the continuous casting machine 11, the maintenance, such as mounting and demounting, of the rollers of the continuous casting machine 11 or facilities related with secondary cooling is easy.

In addition, in the cases of some contents of the maintenance, the thermometer may retreat to the distal end portion of the cast slab in the width direction without retreating to the outside of a continuous caster.

Since the arm member 31 is adapted to be foldable as described above, it is possible to dispose the thermometer 19 at the position of the destination above an area between the adjacent roller segments 14 in the vicinity of the middle portion of the cast slab 13 in the width direction of the cast slab by changing, for example, the radius of rotation of the arm member 31 even though the thermometer 19 is moved to the upstream side or the downstream side in the casting direction. That is, the support 15 and the arm member 31 of the temperature measuring device 30 form not only the above-mentioned retreat measures of the thermometer 19 but also position changing measures. Accordingly, even though the casting speed is changed, it is possible to measure the surface temperature of the cast slab at a position where behind an outlet of the mold and the cooling time of the cast slab is constant. For this reason, the cast slab surface temperature measuring device 30 used in the continuous casting machine according to the first modification is useful for the improvement of the quality of a cast slab.

A cast slab surface temperature measuring device (hereinafter, also simply referred to as a temperature measuring device) 40 used in a continuous casting machine according to a second modification will be described with reference to FIGS. 3A to 3D. The same members as the members of the above-mentioned temperature measuring device 10 are denoted by the same reference signs and the detailed description thereof will be omitted.

An arm member 41 of the temperature measuring device 40 includes a plurality of short arms 42 and 43 (two here but may be three or more). The proximal-side short arm 42 and the end-side short arm 43, which are adjacent to each other, are foldably connected to each other by a connection part 44. The end-side short arm 43 of the two short arms 42 and 43 is provided with a telescopic mechanism 45 of which the length is adjustable. Only the proximal-side short arm may be provided with a telescopic mechanism, and both (two, or more) short arms may be provided with telescopic mechanisms.

The telescopic mechanism 45 is formed of a slide type telescopic mechanism that has been well known in the past and makes the end-side short arm 43 freely reciprocate relative to the distal end portion of the proximal-side short arm 42 in the longitudinal direction of the end-side short arm. Specifically, the connection part 44 mounted on the distal end portion of the proximal-side short arm 42 moves in a long hole (long groove) 46 that is formed in the longitudinal direction of the end-side short arm 43. The telescopic mechanism may be formed of the above-mentioned bellows type telescopic mechanism that has been well known in the past, but is not limited these. For example, the movement of the end-side short arm 43 is manually performed by a worker. However, the short arm may be provided with driving measures and may be automatically moved by a control unit. For example, the folding of the proximal-side short arm 42 and the end-side short arm 43, which are adjacent to each other, is manually performed by a worker. However, the arm member may be provided with driving measures and may be automatically folded by a control unit.

By the above-mentioned configuration, it is possible to make the shape of the arm member 41 be a linear shape (an "I shape"), an "L shape", a "V shape", or the like in plan view and to make the arm member 41 more compact.

A retreat procedure of the thermometer 19 will be described below.

Figure 3A:
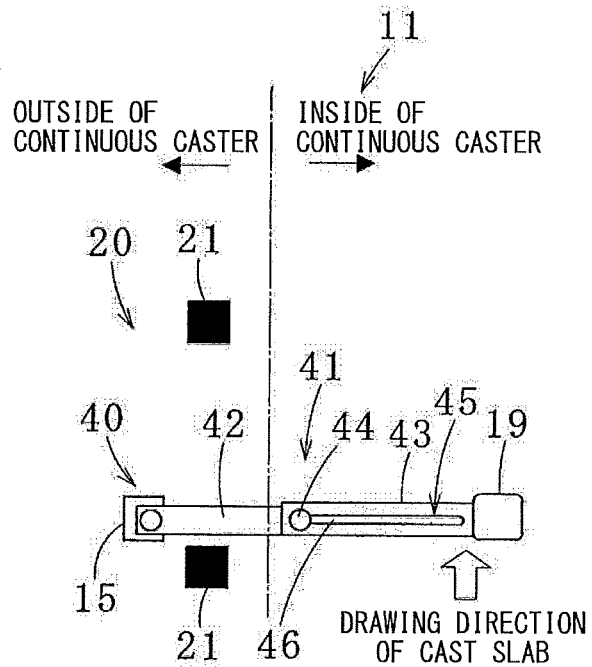
FIG. 3A is a view illustrating a state where a cast slab surface temperature measuring device used in a continuous casting machine according to a second modification is used.

Before the retreat of the thermometer 19, that is, in FIG. 3A, the thermometer 19 is disposed at the position above an area between the adjacent roller segments 14 in the vicinity of the middle portion of the cast slab 13 in the width direction of the cast slab and measures the surface temperature of the cast slab in the width direction. The arm member 41 has a linear shape at this time, but may have an "L shape", a "V shape", or the like.

Figure 3B:
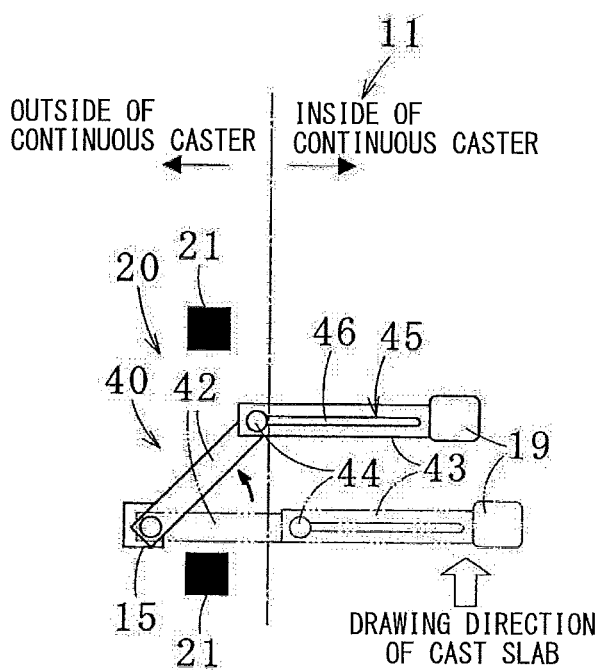
FIG. 3B is a view illustrating a state of the cast slab surface temperature measuring device used in the continuous casting machine according to the second modification in the middle of retreat.

When the thermometer 19 is made to retreat, first, the arm member 41 is rotated about the support 15 in a direction where the connection part 44 is moved to the outside of the continuous casting machine 11 as shown in FIG. 3B (counterclockwise in FIG. 3B). At this time, the arm member 41 is rotated to a position where the connection part 44, which connects the short arm 42 with the short arm 43, is positioned outside the continuous casting machine 11 in plan view. At the same time, the end-side short arm 43 is rotated relative to the proximal-side short arm 42 (clockwise in FIG. 3B) so that the end-side short arm 43 is orthogonal to the casting direction of the cast slab.

Figure 3C:
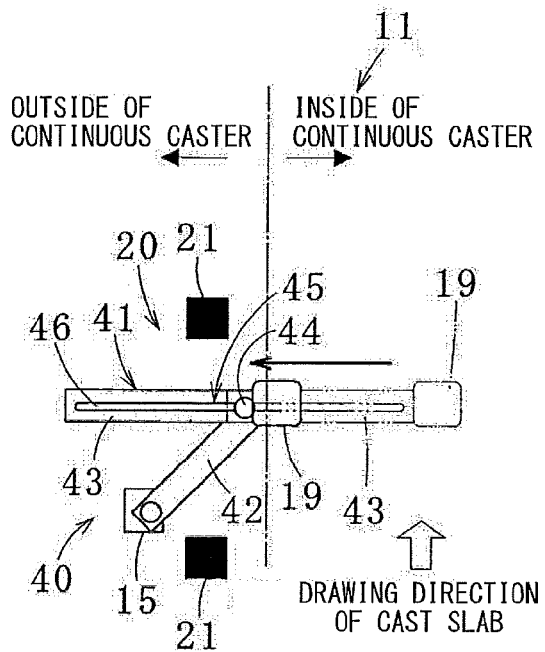
FIG. 3C is a view illustrating a state of the cast slab surface temperature measuring device used in the continuous casting machine according to the second modification in the middle of retreat.

Next, as shown in FIG. 3C, the end-side short arm 43 is made to slide relative to the distal end portion of the proximal-side short arm 42 in a direction where the thermometer 19 and the end-side short arm 43 are moved to the outside of the continuous casting machine 11 from the inside of the continuous casting machine 11 in plan view (to the left side in FIG. 3C). At this time, the short arm 43 is moved to a position where the end-side short arm 43 is positioned outside the continuous casting machine 11 in plan view.

Figure 3D:
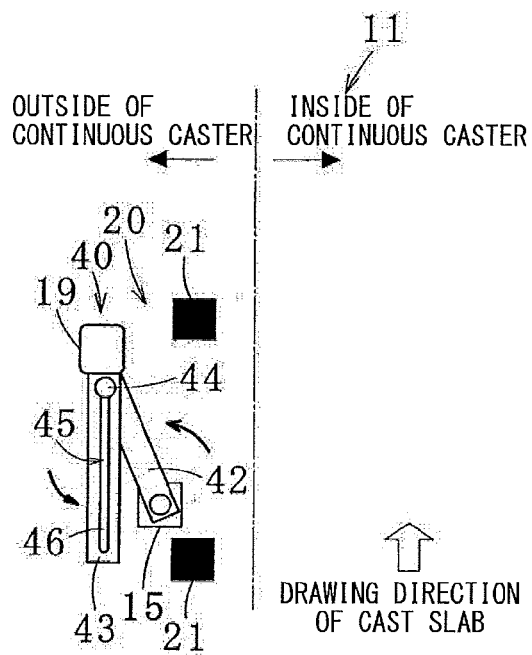
FIG. 3D is a view illustrating the retreat state of the cast slab surface temperature measuring device used in the continuous casting machine according to the second modification.

Further, as shown in FIG. 3D, the proximal-side short arm 42 is rotated about the support 15 in a direction where the thermometer 19 is separated from the inside of the continuous casting machine 11 (counterclockwise in FIG. 3D). At this time, the short arm 42 is rotated to a position where the thermometer 19 is positioned outside the continuous casting machine 11 in plan view.

As described above, the support 15 and the arm member 41 of the temperature measuring device 40 form the retreat measures of the thermometer 19 and position changing measures.

It is possible to make the thermometer retreat to the outside of the continuous casting machine 11 by the above-mentioned temperature measuring device 10 or temperature measuring device 30. However, since the telescopic mechanism 45 is provided like in the temperature measuring device 40, the number of alternatives (methods or procedures of moving the arm member to retreat) of the retreat measures of the thermometer 19 is increased. Accordingly, it is possible to perform a work for retreat according to the surrounding environment.

When the cast slab surface temperature measuring device, which is used in the continuous casting machine according to this embodiment, is used as described above, it is possible to suppress or prevent an effect of steam and the like, which reduces the measurement accuracy of the surface temperature of a cast slab, and to simplify the maintenance work of the continuous casting machine by improving the maintainability of the thermometer during continuous casting.

EXAMPLE

Next, an example, which is performed to confirm the effect of the invention, will be described. The temperature measuring device 10 having the configuration shown in FIGS. 1A and 1B was used, the position corresponding to the height of a light receiving opening (light receiving opening of the thermometer) of a radiation thermometer relative to the surface of a cast slab was changed to various positions, and a temperature measurement error (error) was examined. Measurement was performed after about one month has passed after the cleaning of the light receiving opening, and was performed about thirty times for two years. The results thereof are shown in FIG. 4.

Figure 4:
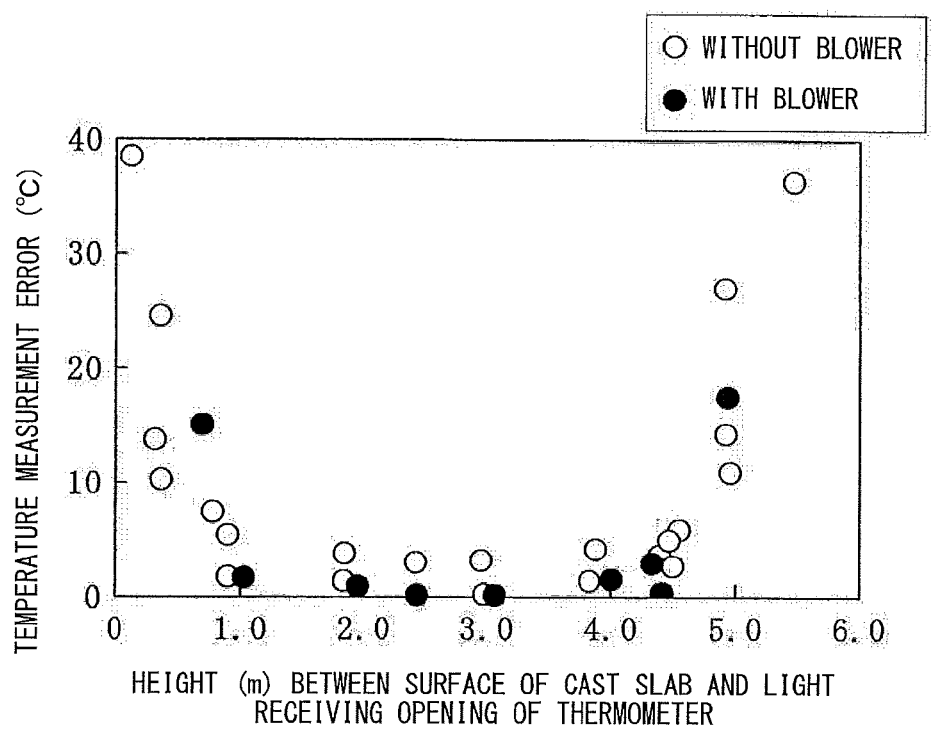
FIG. 4 is a graph showing a relationship between a height to a light receiving opening of a thermometer from the surface of a cast slab and a temperature measurement error of the surface of the cast slab.

The temperature measurement error shown in FIG. 4 was obtained from "(a batch measured value obtained by a thermocouple)−(a measured value obtained by a radiation thermometer)" by the comparison of a batch measured value obtained by a thermocouple and a measured value obtained by a radiation thermometer. The results are shown by the results when air is blown at a wind speed of 2 to 10 m/s below the light receiving opening (with blower/● mark) and the results when air is not blown below the light receiving opening (without blower/○ mark).

When a height (distance) between the surface of a cast slab and the light receiving opening of the thermometer was in the range of 1.0 to 4.5 m, regardless of whether air was blown, the error was smaller than 10° C. as apparent from FIG. 4 and sufficiently practical use was allowed.

When the height was smaller than 1.0 m, foreign materials were attached to the light receiving opening after a thermometer was used for a few weeks and an error of 10° C. or more appeared on the results of the temperature measurement. On the other hand, when the height exceeded 4.5 m (5.0 m in FIG. 4), the thermometer fixed by the support and the arm member was affected by a low-temperature structure such as rollers disposed around a measurement place and there was a case where a large error appeared on the results of the temperature measurement.

As described above, when the height between the surface of a cast slab and the light receiving opening of the thermometer was in the range of 1.0 to 4.5 m, good results of the temperature measurement were obtained regardless of whether air was blown. That is, practical use was allowed regardless of whether air was blown.

However, errors when air was blown below the light receiving opening were smaller in this range. That is, a condition where air is blown is a preferable condition on the point of reducing errors.

From the above-mentioned results, it was possible to confirm that it is possible to suppress or prevent an effect of steam and the like, which reduces the measurement accuracy of the surface temperature of a cast slab, when the cast slab surface temperature measuring device, which is used in the continuous casting machine according to the embodiment of the invention, is used.

The invention has been described above with reference to the embodiment. However, the invention is not limited to any configuration described in the embodiment, and also includes other embodiments and modifications that are devised within the scope of the fact described in claims. For example, a case where the slab surface temperature measuring device used in the continuous casting machine of the invention is formed by the combination of all or a part of the above-mentioned respective embodiment and modifications is also included in the range of the right of the invention.

A case where the cast slab surface temperature measuring device is installed on one side of the roller support parts in the width direction has been described in the above-mentioned embodiment. However, the cast slab surface temperature measuring device may be installed on both sides of the roller support parts in the width direction (the same position or different positions in the drawing direction of a cast slab).

A case where the cast slab surface temperature measuring device is installed at only one position has been described. However, the cast slab surface temperature measuring devices may be installed at a plurality of positions in the drawing direction of a cast slab, and the cast slab surface temperature measuring devices may be disposed alternately (in a zigzag pattern) at a plurality of positions on both sides of the roller support parts in the width direction over the drawing direction of a cast slab.

INDUSTRIAL APPLICABILITY

In the cast slab surface temperature measuring device of the invention, it is possible to suppress or prevent an effect of steam and the like, which reduces the measurement accuracy of the surface temperature of a cast slab, and to simplify the maintenance work of the continuous casting machine by improving the maintainability of the thermometer during continuous casting.

REFERENCE SIGNS LIST

10: cast slab surface temperature measuring device used in continuous casting machine 11: continuous casting machine
12: secondary cooling zone
13: cast slab
14: roller segment (roller support part)
15: support (support member)
16: proximal portion
17: arm member
18: distal end portion
19: radiation thermometer
20: passage
21: structure
30: cast slab surface temperature measuring device used in continuous casting machine
31: arm member
32, 33: short arm
34: connection part
40: cast slab surface temperature measuring device used in continuous casting machine
41: arm member
42, 43: short arm
44: connection part
45: telescopic mechanism
46: long hole

The invention claimed is:

1. A cast slab surface temperature measuring device used in a continuous casting machine that measures a surface temperature of a part or all of a cast slab in a width direction of the cast slab, in a secondary cooling zone of the continuous casting machine, the cast slab surface temperature measuring device comprising:
    a support member that is installed on a side of roller support parts by which rollers are rotatably supported;
    an arm member of which a proximal portion is rotatably mounted on the support member, wherein the arm member includes a plurality of short arms which are adjacent to each other and which are foldably connected to each other by a connection part; and
    a radiation thermometer which is provided at a distal end portion of the arm member and of which a light receiving opening is placeable at a position corresponding to a height in a range of 1.0 to 4.5 m from a surface of the cast slab.

2. The cast slab surface temperature measuring device used in the continuous casting machine according to claim 1, wherein at least one of the short arms includes a telescopic mechanism of which a length is adjustable.

3. The cast slab surface temperature measuring device used in the continuous casting machine according to claim 1, wherein the arm member includes a telescopic mechanism of which the length is adjustable.

* * * * *